(12) United States Patent
Mandry et al.

(10) Patent No.: US 10,648,190 B2
(45) Date of Patent: May 12, 2020

(54) METHOD FOR INSTALLING A SOLAR PANEL ARRAY USING A MODULAR BALLAST SYSTEM

(71) Applicant: Anar Solar, LLC, Derry, NH (US)

(72) Inventors: James E. Mandry, North Andover, MA (US); Mark Pelletier, Derry, NH (US); Raymond M. Bourque, Bristol, NH (US)

(73) Assignee: Anar Solar, LLC, Derry, NH (US)

( * ) Notice: Subject to any disclaimer, the term of this patent is extended or adjusted under 35 U.S.C. 154(b) by 0 days.

(21) Appl. No.: 14/489,800

(22) Filed: Sep. 18, 2014

(65) Prior Publication Data

US 2015/0159395 A1   Jun. 11, 2015

Related U.S. Application Data

(60) Provisional application No. 61/879,333, filed on Sep. 18, 2013.

(51) Int. Cl.
*E04H 14/00* (2006.01)
*E04H 12/22* (2006.01)
(Continued)

(52) U.S. Cl.
CPC ......... *E04H 12/2246* (2013.01); *E04H 12/00* (2013.01); *F24J 2/525* (2013.01);
(Continued)

(58) Field of Classification Search
CPC ..... E04H 12/2246; E04H 12/00; H02S 20/10; H02S 20/30; F03D 11/045; F24J 2/5239;
(Continued)

(56) References Cited

U.S. PATENT DOCUMENTS

| | | |
|---|---|---|
| 4,892,442 A | 1/1990 | Shoffner |
| 2007/0018057 A1 | 1/2007 | Kovac |

(Continued)

OTHER PUBLICATIONS

International Search Report with Written Opinion in PCT Application PCT/US/2014/056234, US PCT, dated Oct. 31, 2014.

*Primary Examiner* — Brian D Mattei
(74) *Attorney, Agent, or Firm* — Evan R. Smith; Cogent Law Group

(57) ABSTRACT

A modular ballast system for supporting objects uses tubing such as pipes of appropriate size for the required ballast. Once in place, the empty pipes are filled with a watery mix (slurry) of sand, silt, gravel, soil, cement or other generally available material to generate a majority of the ballast weight. A two piece clamping mechanism provides fixed placement attachment points suitable for attachment by supported structures. The lower piece of the clamping mechanism sits under the ballast tubing and is designed to both support and disperse the anticipated weight of the objects with minimal impact on the surface beneath it. The upper piece of the clamping mechanism mates to the lower clamping piece and completes a full 360 degree collar around the ballast tubing to create a durable clamping mechanism that both captures the weight and position of the ballast tubing and prevents the ballast tubing from shifting.

20 Claims, 5 Drawing Sheets

(51) Int. Cl.

| | |
|---|---|
| *F24S 25/16* | (2018.01) |
| *F24S 25/65* | (2018.01) |
| *H02S 20/10* | (2014.01) |
| *H02S 20/30* | (2014.01) |
| *E04H 12/00* | (2006.01) |
| *F24J 2/52* | (2006.01) |
| *H02S 20/24* | (2014.01) |
| *H02S 40/36* | (2014.01) |
| *F24J 2/54* | (2006.01) |

(52) U.S. Cl.
CPC ............. *F24J 2/5264* (2013.01); *F24S 25/16* (2018.05); *F24S 25/65* (2018.05); *H02S 20/10* (2014.12); *H02S 20/24* (2014.12); *H02S 20/30* (2014.12); *H02S 40/36* (2014.12); *F24J 2002/5292* (2013.01); *F24J 2002/5489* (2013.01); *Y02B 10/12* (2013.01); *Y02B 10/20* (2013.01); *Y02E 10/47* (2013.01)

(58) Field of Classification Search
CPC .. F24J 2/525; F24J 2/526; F24J 2/5264; F24J 2002/5489; Y02E 10/47
See application file for complete search history.

(56) References Cited

U.S. PATENT DOCUMENTS

| | | | |
|---|---|---|---|
| 2008/0029148 A1* | 2/2008 | Thompson | 136/244 |
| 2008/0087275 A1* | 4/2008 | Sade et al. | 126/623 |
| 2009/0208288 A1 | 8/2009 | Stephens et al. | |
| 2009/0302183 A1* | 12/2009 | Strizki | 248/309.1 |
| 2010/0147359 A1 | 6/2010 | Harberts et al. | |
| 2010/0325975 A1 | 12/2010 | Mischo | |
| 2011/0030675 A1* | 2/2011 | King | F24J 2/0015 126/634 |
| 2012/0279557 A1 | 11/2012 | Alwitt et al. | |
| 2013/0199654 A1 | 8/2013 | Jeon | |
| 2013/0276867 A1* | 10/2013 | Wildes et al. | 136/246 |

* cited by examiner

METHOD FOR INSTALLING A SOLAR PANEL ARRAY USING A MODULAR BALLAST SYSTEM

CROSS-REFERENCE TO RELATED APPLICATIONS

This application claims priority from U.S. Provisional Patent Application No. 61/879,333 titled "A TERRAIN COMPLIANT, ECO-FRIENDLY, MODULAR BALLAST SYSTEM WITH OPTIONAL INTEGRATED WIRE MANAGEMENT AND RACKING SYSTEM", which was filed on Sep. 19, 2013 and which is incorporated fully herein by reference.

TECHNICAL FIELD

The present invention relates to systems for supporting devices such as racks used in solar electrical generating systems or windmills used to generate electricity and more particularly, relates to a system for facilitating easy and quick mounting of racks or arrays of such systems and for allowing such mounted systems to be held in place on a surface intended to support such a structure without having to permanently anchor such a system to the ground or other structure and for providing a location through which electrical wires can be safely routed away from the supported devices.

BACKGROUND INFORMATION

Large installations containing racks or arrays of products such as solar cells used to generate electricity are becoming more and more common and desirable. Very often these arrays are located in large, open exposed areas such as fields, former landfills and rooftop settings. These large arrays are rather heavy and must be supported on the ground or other surface on which they rest and in addition, the supporting elements must safeguard against the array moving, shifting or even being toppled from natural elements such as the wind.

In the prior art, such arrays are either permanently or semi-permanently attached to the ground or other surface supporting the structure utilizing steel beams or large concrete blocks. Prior art systems for affixing solar panels and wind turbines are commercially available in numerous forms. These systems generally fall into 2 categories.

The first category of systems requires significant site work and uses either poured cement footings or objects (such as auger screws) driven into the ground or rooftops to act as anchors for applications such as a solar panel mounting system.

The second category of systems uses ballast (weight) to hold down parts of the application mounting system. The ballast used in present systems generally consists of singularly large or multiple cement blocks for each ballast site. For typical solar field applications, these ballast blocks can weigh as much as 8 tons. While this approach seems to impact the terrain at or on which the weight is mounted minimally, the peripheral damage done to the terrain in moving the ballast weights into position can be significant. This occurs because in many cases, utilizing the prior art array mounting system necessitates the use of large machinery which can permanently damage the ground or in some instances, cannot even be brought to the installation site; require permanent or semi-permanent installation elements such as steel beams attached to a roof structure; or otherwise necessitate significant disturbance to the area at which the array is to be mounted such as the use of large auger screws inserted in the ground.

A problem with present systems is that they require significant site work and/or greatly disturb the terrain when equipment is run over the terrain. In many potential sites for solar or wind turbine applications, it is not possible or desirable to have such extensive site work done. Further, more site work will be needed when the solar or wind turbine application is eventually removed.

For example, closed and capped landfills provide an ideal large, expansive and open area on which to mount solar arrays. Unfortunately, however, closed landfills are generally capped with a rubber or other similar impervious membrane which cannot be penetrated by auger screws and large machinery cannot be moved onto the capped landfill for fear of damaging the cap.

Therefore, it is important and indeed a requirement that in order to place a structure on certain areas, such as on top of capped landfills or roofs for example, the installation must not puncture or otherwise damage the ground or structure on which the array is going to be placed.

An additional concern is that in present systems for solar or wind turbine applications, significant site work is required to manage the electrical wiring. For example, in open space applications in the United States, either 18 inch deep trenches for wiring conduit or 6 inch deep trenches with wiring conduit covered by at least 3 inches of concrete must be created to bury a majority of the wiring for such electricity generating systems.

Accordingly, a system and method is needed which provides a mounting system or ballast to support a large array, such as a solar array, which will not itself damage any underlying structure while still adequately supporting the array, and which can be easily installed and, if ultimately needed to be uninstalled, utilizing equipment, if required, that will not damage the underlying structure and/or surface on which the array is mounted. Moreover, a system is also needed to provide wire management such that a safe enclosure of high voltage AC or DC wires is provided without the need for digging either shallow trenches with concrete above or deep trenches without concrete.

An additional concern and consideration in the use and placement of such arrays is the significant manpower required to mount the individual smaller pieces or cells which collectively make up the larger array. Because such cells are manufactured products, there are slight differences in their manufactured height, width or thickness. These variances must be accounted for in any mounting system. In addition, it is often required to angle or tilt such arrays in order to properly orient the array in the case of, for example, solar arrays which must be properly angled towards the sun to achieve the best results.

Such current mounting systems require metal braces and/or support structures to be assembled using nuts and bolts to hold the individual pieces together. Constructing such a racking or mounting system is time-consuming. In addition, there is often not enough adjustment in the mounting system to account for the variances and/or tolerances in the individual cells or pieces being assembled and mounted together.

Accordingly, what is needed is a mounting or racking system which is easy to assemble and easy to adjust to account for variances and tolerances in the underlying elements being mounted and which can easily be easily positioned and repositioned as required.

SUMMARY

The present invention features an innovative ballast system for affixing solar panels and other objects needing a fixed placement (such as windmills for example) and the like to nearly any location on the ground or rooftop or the like.

The ballast itself is accomplished using tubes or tubing of a size appropriate for the ballast required. The tubes used for these purposes is preferably tubing that can be commonly found in the construction industry and known as plastic corrugated drainage pipe and as such is readily available and also has available pipe couplers and pipe ends and other fittings which might be necessary. Such tubing is readily available and relatively inexpensive. Any practical length of ballast tubing can be created by cutting or coupling these drainage pipes to form the ballast tubes.

Once filters are affixed to the ends of the pipes that allow only water to pass through, the pipes can be filled with a low cost, on-site readily available chemical-free watery mix of sand, silt, gravel, or other available soils to generate a majority of the ballast weight. The somewhat rigid but plastic nature of the drainage pipe allows the filled drainage pipe to follow the major contour of the terrain on which the ballast tubing is placed. Once the water escapes from the ends of the tubing, all that is left is the solid sand, silt, gravel or other available soil. Removal of the pipes can be accomplished very simply by providing water to the interior of the pipe which in turn mixes with the sand, silt, gravel or other previously inserted soil and once this mixture is watery enough, 10 more end caps can be removed and the watered-down mixture simply runs out of the pipe onto the ground or other structure on which the ballast had previously been mounted, all without damaging the surface or needing to be treated as hazardous or dangerous waste material.

In one embodiment, a two (2) piece 'clamshell' clamping or coupling mechanism has been developed as part of the invention to create fixed placement attachment points suitable for attachment by structures supporting solar panels and other objects needing a fixed placement. The lower piece of the clamping mechanism sits under the ballast tubing and is designed to both support and disperse the anticipated weight of the objects being affixed with minimal impact on the surface beneath it. If necessary and permitted, optional short or long points can be affixed to the bottom of the lower clamping mechanism to dig into the surface beneath the lower clamping mechanism to further reduce possible lateral travel, especially on terrain with larger (i.e. steeper) slopes.

In the preferred embodiment, the upper piece of the clamping mechanism mates to the lower clamping piece and completes a full 360 degree collar around the ballast tubing to create a durable clamping mechanism that both captures the weight and position of the ballast tubing and prevent the ballast tubing from shifting. Together, both clamping pieces handle vertical forces (weight down and lift up from possible wind forces) as well as lateral forces from the affixed structures. In certain applications, the lower portion of the clamping mechanism may be used without the upper portion of the clamping mechanism. Clamping mechanisms may be placed at appropriate intervals along the length of the ballast tubes based upon the specific application. In other embodiments, the clamping or coupling mechanism may be a two piece mechanism that is not hinged but rather, the pieces may be held together using cam rods, nuts and bolts, etc. or any other device to hold the two piece clamping or coupling mechanism together.

In most situations, the ballast system of the present invention will include multiple ballast tubes and clamping mechanisms used in parallel pairs separated by a fixed distance so as to accept, for example, four legs of a solar panel mounting system. Adjustable length spacer rods may be affixed between parallel clamping mechanisms to set and maintain the proper distance between the parallel pairs and to keep related clamping mechanisms square to each other. By using the length adjusters on the spacer rods, the lengths of the rods can be increased as needed to compensate for terrain slopes where the distance between vertical legs of a solar panel mounting system sitting on top of the clamping mechanism must be maintained but the distance between parallel clamping mechanisms needs to be increased to compensate for the terrain slope angle. Similarly, the distance between adjacent clamping mechanisms on the same ballast tubes can be increased by simply placing or sliding the clamping mechanisms further apart from each other to compensate for a terrain slope in the direction of the ballast tubes. When the proper distance between adjacent clamping mechanisms has been set, the clamping mechanisms can be fixed at the position on the ballast tube by, for example, driving self-tapping screws into the ballast tubes through pre-drilled holes in the clamping mechanism. For unprecedented ease of setup, physical 'tic' marks and/or color coding marks can be used to indicate proper spacer rod and clamping mechanism spacing settings if the terrain slope is known ahead of time.

A special ball joint has been designed to attach to the application mounting point on the clamping mechanism for use when the ballast system will be installed where the terrain is not level. This ball joint will, if utilized, allow for legs of a mounting application to be mounted with an angle of up to about 20 degrees off perpendicular from the clamping mechanism mount point and this angle can be achieved for any orientation (360 degrees) of the leg. Combined with the ability to space the clamping mechanisms to compensate for terrain slopes, the ball joint allows for mounting the legs of an applications perfectly vertical despite any slope at any orientation of up to 20 degrees.

Commercial applications of these ballast systems for large solar panel arrays in fields and other non-flat areas will likely require 2 ballast tubes captured by each clamping mechanism to offer enough ballast against wind forces and to minimize lateral movement on sloped terrains. Thus, a typical solar panel racking system will require a total of 4 ballast tubes (2 in front, 2 in back).

The present invention also features a wire management system in the form of a conduit suspended in the center of one of the ballast tubes. The conduit suspended in the center of one of the ballast tubes provides a safe enclosure for high voltage AC or DC wires without the need for digging either shallow trenches with concrete above or deep trenches without concrete. The filled ballast tube material surrounding the electrical conduit provides a safe enclosure of the conduit. By matching the length of the conduit to the length of the drainage pipe being used, both the conduit and the drainage pipe can be easily coupled together to create a seamless and modular enclosure system for the electrical wiring. At specific intervals, 'T's will be added to the enclosed suspended conduit with a short perpendicular conduit pipe protruding through a cutout hole in the drainage pipe to accommodate electrical wires entering or leaving the conduit system.

In stark contrast to existing ballast systems that typically use preformed concrete blocks, the ballast system according to the present invention uses eco-friendly, readily available and generally low cost ballast materials that are, in one embodiment, initially dissolved in water and pumped into the ballast tubing. The labor and impact on the environment for machinery (such as traditional concrete pumping machinery and vehicles) to move (pump) the ballast material is minimized with this new innovative system whereas, for example, rubber roofs on buildings and fields have been severely damaged in large commercial solar installations from equipment moving large concrete blocks for existing ballast systems. Depending on the terrain, it may be possible to fill the ballast tubes without having any machinery at all in the ballast array area by filling the connected ballast tubes from one side (end) only.

Similarly, when eventual removal of the system is necessary, the environmental impact is minimized with this new innovative system by simply vacuuming the ballast material from the ballast tubes without damaging the terrain. The integrated wire management system further reduces terrain impact on installation and removal.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
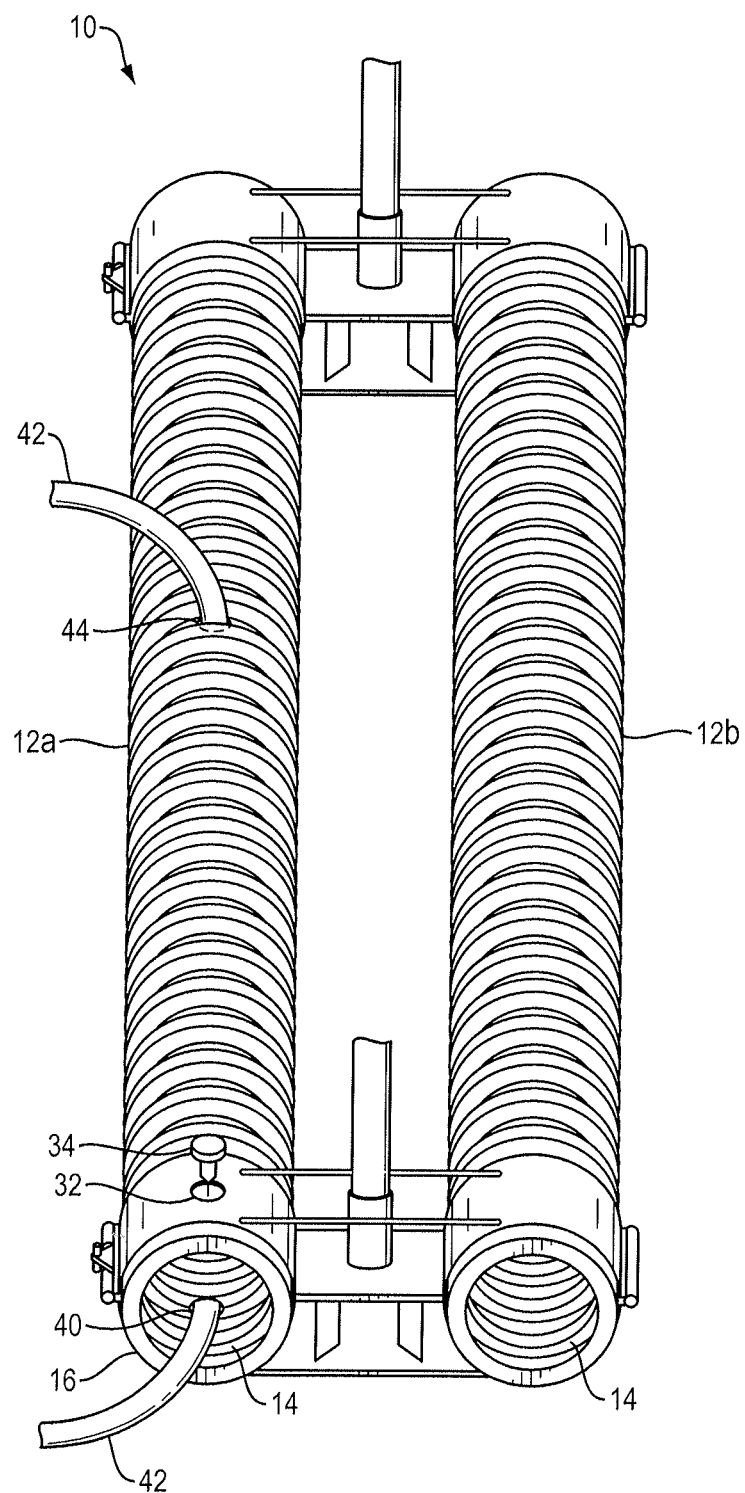
FIG. 1 is a schematic diagram of a portion of the ballast system according to the present invention.

According to one aspect of the present invention, the invention features a ballast system 10, FIG. 1, for a structure designed to be supported 13 (for example a solar electricity generating panel or windmill—not shown) on a surface such as on the earth or a rooftop and which can easily be installed without the necessity of utilizing large machinery and without damaging the surface supporting the structure or the underlying material under the surface.

The present invention features an innovative ballast system for affixing solar panels and other objects needing a fixed placement (such a windmills or boardwalks/walkways for example) and the like to nearly any location on the ground or rooftop or the like without causing damage and minimizing pressure to the underlying ground or roof.

The ballast itself is accomplished using tubing 12 of size appropriate for the ballast required. The tubing 12 used for these purposes is preferably tubing that can be commonly found and utilized in the construction industry and generally known as plastic corrugated drainage pipes although this is not a limitation of the present invention as the ballast tubing could be any type of "tube", tubing or pipe or other similar generally hallow structure made out of steel, aluminum, cement, plastic or the like that can be at least partially filled with ballast material. Another feature of such common corrugated drainage pipes to be used as ballast tubes is that there are available pipe couplers and pipe ends and other fittings which might be necessary. Such tubing is readily available and relatively inexpensive. Any practical length of ballast tubing can be created by cutting or coupling these drainage pipes. In addition, any practical diameter of the tubing may be used based on the amount of ballast required for the device to be supported. It is contemplated that at least a 6 inch tube or pipe would be utilized although such tubes are readily available in diameters from 6 inches to 24 inches.

Once filters are affixed to the ends of the pipes that allow only water to pass through, the pipes can be filled with a low cost, on-site readily available chemical-free watery mix of sand, silt, gravel, or other available soils 14 to generate a majority of the ballast weight. The somewhat rigid but plastic nature of the drainage pipe allows the filled drainage pipe to bend and flex to follow the major contour(s) of the terrain on which the ballast tubing is placed. Once the water escapes from the ends of the tubing, all that is left is the solid sand, silt, gravel or other available soil.

Removal of the pipes can be accomplished very simply by providing water to the interior of the pipe which in turn mixes with the sand, silt, gravel or other previously inserted soil and once this mixture is watery enough, 10 more end caps can be removed and the watered-down mixture simply runs out of the pipe onto the ground or other structure on which the ballast had previously been mounted, all without damaging the surface or needing to be treated as hazardous or dangerous waste material.

Figure 2:
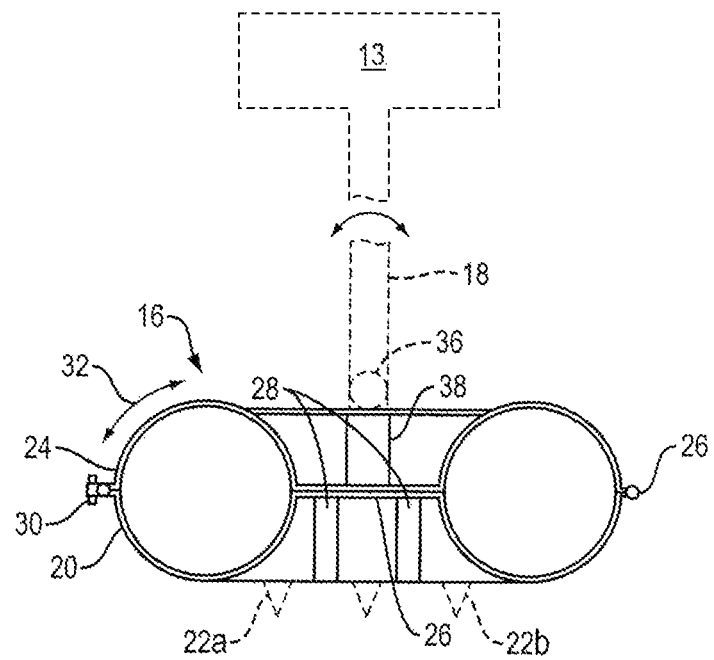
FIG. 2 is a schematic diagram of a clamshell mechanism in accordance with one feature of the present invention.

In the preferred embodiment, a two (2) piece 'clamshell' clamping mechanism 16, FIG. 2 is provided to create fixed placement attachment points 18 suitable for attachment by structures supporting solar panels and other objects needing a fixed placement. The lower piece 20 of the clamping mechanism 16 sits under the ballast tubing 12 and is designed to both support and disperse the anticipated weight of the objects being affixed with minimal impact on the surface beneath it. If necessary and permitted, optional short or long points 22 can be affixed to the bottom of the lower clamping mechanism 20 to dig into the surface beneath the lower clamping mechanism to further reduce possible lateral travel, especially on terrain with larger (i.e. steeper) slopes.

The lower clamping mechanism 20 typically includes a short plate section 26 and one or more vertical supports 28 which serve to support the weight of any structure to which the invention is providing ballast. The spacing or distance between the two ballast tubes 12 as well as the size and placement of the several support structures 28 is all dependent upon the size of the ballast system and the weight which is to be supported. All of this is considered to be within the scope of someone skilled in the art of structural supports.

In the preferred embodiment, the upper piece of the clamping mechanism 24 mates to the lower clamping piece at region 26 in the form of a hinge and completes a full 360 degree collar around the ballast tubing to create a durable, hingable clamping mechanism that is held in place by a nonpermanent clamping or locking mechanism 30 which allows the clamping mechanism to open or close in the direction generally indicated by arrow 32. The clamping mechanism both captures the weight and position of the ballast tubing and prevents the ballast tubing from shifting. Together, both clamping pieces 20 and 24 handle vertical forces (weight down and lift up from possible wind forces)

as well as lateral forces from the affixed structures. In certain applications, the lower portion 20 of the clamping mechanism 16 may be used without the upper portion 24 of the clamping mechanism 16. Clamping mechanisms 16 may be placed at appropriate intervals along the length of the ballast tubes based upon the specific application.

In other contemplated embodiments, the clamping mechanism may not be hinged and/or may be held together by one or more various means including, but not limited to cam rods, nuts and bolts, etc. In other embodiments, the clamping mechanism top and bottom sections may not even be fastened together by any means.

In most situations, ballast tubes 12 and clamping mechanisms 16 will be used in parallel pairs separated by a fixed distance so as to accept, for example, four legs of a solar panel mounting system. Adjustable length spacer rods may be affixed between parallel clamping mechanisms to set and maintain the proper distance between the parallel pairs and to keep related clamping mechanisms square to each other. By using the length adjusters on the spacer rods, the lengths of the rods can be increased as needed to compensate for terrain slopes where the distance between vertical legs of a solar panel mounting system sitting on top of the clamping mechanism 16 must be maintained but the distance between parallel clamping mechanisms 16 needs to be increased to compensate for the terrain slope angle. Similarly, the distance between adjacent clamping mechanisms 16 on the same ballast tubes 12 can be increased by simply placing or sliding the clamping mechanisms 16 further apart from each other to compensate for a terrain slope in the direction of the ballast tubes 12. When the proper distance between adjacent clamping mechanisms has been set, the clamping mechanisms 16 can be fixed at the position on the ballast tube 12 by, for example, driving self-tapping screws 34 into the ballast tubes 12 through pre-drilled holes 32 in the clamping mechanism 16. For unprecedented ease of setup, physical 'tic' marks and/or color coding marks can be used to indicate proper spacer rod and clamping mechanism spacing settings if the terrain slope is known ahead of time.

A special ball joint 36 has been designed to attach to the application mounting point 38 on the clamping mechanism for use when the ballast system will be installed where the terrain is not level. This ball joint 36 will allow for legs of a mounting application to be mounted with an angle of up to approximately 20 degrees off perpendicular from the clamping mechanism 16 mount point, and this angle can be achieved for any orientation (360 degrees) of the leg. Combined with the ability to space the clamping mechanisms to compensate for terrain slopes, this ball joint, if provided, allows for mounting the legs of an application perfectly vertical despite any slope at any orientation of up to 20 degrees.

Commercial applications of such ballast systems for large solar panel arrays in fields and other non-flat areas will likely require 2 ballast tubes 12 captured by each clamping mechanism 16 to offer enough ballast against wind forces and to minimize lateral movement on sloped terrains. Thus, a typical solar panel racking system will require a total of 4 ballast tubes (2 in front and 2 in back).

Figure 3:
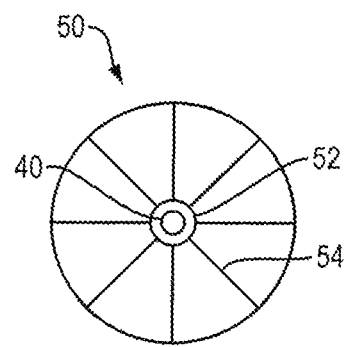
FIG. 3 is a schematic end view of a conduit support structure according to one feature of the present invention.
Figure 4:
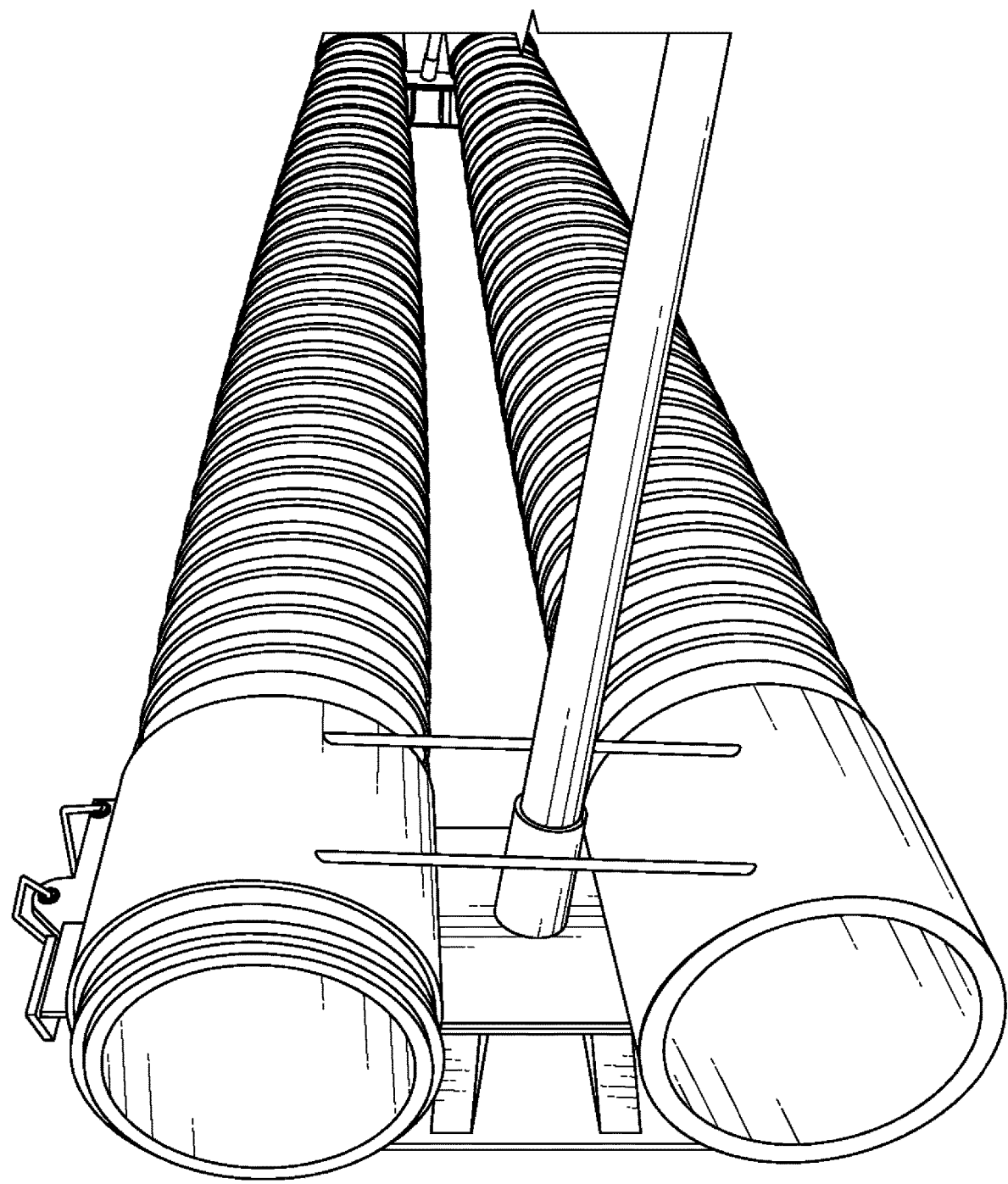
FIG. 4 is a perspective view of an assembled ballast system according to the teachings of the present invention.
Figure 5:
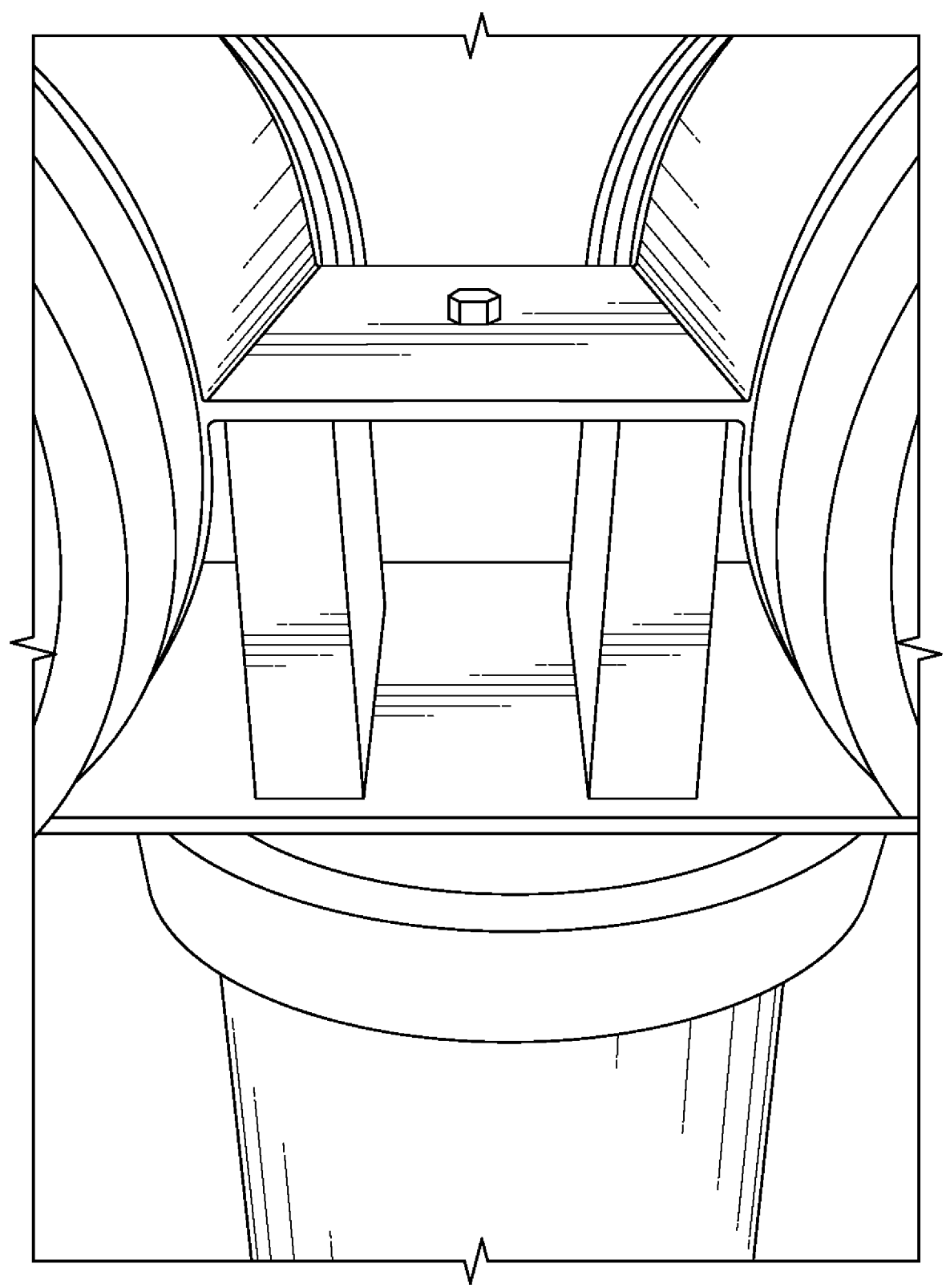
FIG. 5 is a close-up end view of the clamshell mechanism installed on ballast tubing in accordance with the teachings of the present invention.
Figure 6:
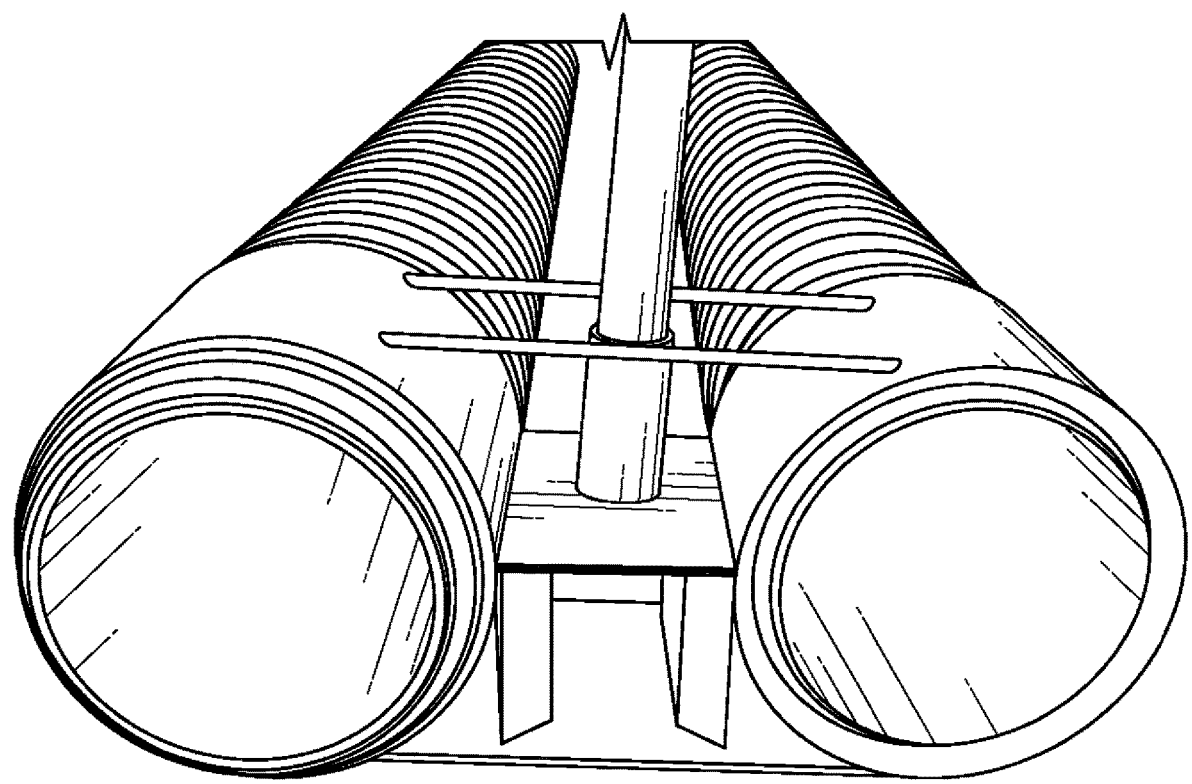
FIG. 6 is a close-up end view of the central portion of the clamshell mechanism according to one aspect of the present invention.

The present invention also features a wire management system in the form of a conduit 40 suspended in the center of one of the ballast tubes 12. A conduit supporting structure 50, FIG. 3, that looks somewhat like a bicycle wheel suspends the conduit 40 in the center of the ballast tube 12. The conduit supporting structure 50 includes spokes 54 like a bicycle wheel to allow the ballast material mixed with water to flow unencumbered through and around the spokes 52.

The present implementation uses a 4 inch wide flat circular ring at the outer edge of the conduit support structure that has a diameter just under the inside diameter of the ballast tube. The central region 52 of the conduit support structure includes a generally flat circular ring that has a diameter just a bit larger than the outer diameter of the conduit 40 being suspended and through which the conduit is passed. The 4" wide concentric rings (outer ring at the ballast tube, inner ring around the conduit) are wide enough to prevent the conduit support structure 50 from jamming as the one or more conduit support structures 50 pre-mounted on a length of conduit 40 are slid inside the ballast tube (similar to a piston moving in a cylinder).

It is anticipated that four (4) conduit suspension structures 50 will be used in a 20 foot ballast tube; one at each end of the ballast tube, 1 toward the middle of the ballast tube, and 1 near the conduit 'T' that provides an opening for wire(s) 42 to enter or exit the conduit through a hole 44 in the side of the ballast tube 12.

The present conduit support structure 50 may be made from plastic but can be constructed from any suitable material(s). If the conduit 40 is plastic and the conduit support structure 50 is plastic, PVC cement/glue can be used to hold the conduit support structures 50 at a fixed point along the conduit. Alternatively, if the conduit 40 is a material like steel and/or the conduit support structure 50 is not plastic, hose clamps such as those used in automotive applications can be tightened on one or both sides of the conduit support structure 50 to hold the conduit support structure at fixed points along the conduit.

The conduit 40 suspended in the center of one or more of the ballast tubes 12 provides a safe enclosure for high voltage AC or DC wires 42 without the need for digging either shallow trenches with concrete above or deep trenches without concrete. The filled ballast tube material 14 surrounding the electrical conduit 40 provides a safe enclosure for the conduit and the electric wires 42 located inside the conduit 40.

By matching the length of the conduit 40 to the length of the ballast tube 12 being used, both the conduit 40 and the ballast tube 12 which serves as ballast can be easily coupled together to create a seamless and modular enclosure system for the electrical wiring. At specific intervals, 'T's may be added to the enclosed suspended conduit 40 with a short perpendicular conduit pipe protruding through a cutout hole 44 in the ballast tube 12 to accommodate electrical wires 42 entering or leaving the conduit system. The total length of the modular conduit, including any inserted 'T's needs to be set such that the conduit can be properly coupled to an adjacent conduit while being completely enclosed by the drainage pipe and any drainage pipe coupler. In most typical scenarios, a separate coupler fits over the end of the conduit and therefore the modular conduit 40 length equals the length of the modular ballast tube 12. In some conduit systems, the coupler is built on one end of the conduit in which case the conduit length will be longer than the ballast tube 12 as the modular conduit length will include the length of the coupler.

With the conduit length properly set for a modular ballast system, including any 'T's, the conduit support structures are slipped over the conduit and affixed to the conduit at the proper locations (both ends of the conduit, at the 'T', and toward the middle of the conduit) before being inserted into the center of the ballast tubes 12. If cabling is not going to be snaked into the conduit later, electrical wires/cables meant to carry the generated power need to be inserted into the modular conduit with appropriate connectors at the conduit ends and at the 'T'.

The conduit 40 with the attached conduit support structures 50 are then slipped into the ballast tube 12 that should be aligned to the adjacent ballast tube 12 to be coupled to, but with a small space between the 2 ballast tubes 12. Using that small space between the ballast tube 12, the ends of the wires/cables 42 are connected and then the unconnected conduit is pulled toward the end of the already affixed conduit and the necessary connections to couple the conduits together is then made.

To complete that piece of the modular ballast system, the loose ballast tube 12 is pushed and coupled into the adjacent already affixed ballast tube 12. With the conduit and conduit wiring in place, the appropriate filters and connectors at the ends of the ballast tubes 12, and the ballast tube clamping mechanisms properly placed and squared to each other, the ballast tubes 12 can now be filled with the eco-friendly watery soil, sand, gravel, etc. mix, or can be filled with traditional cement.

In stark contrast to existing ballast systems that typically use preformed concrete blocks, the ballast system 10 according to the present invention uses eco-friendly, readily available and generally low cost ballast materials that are initially dissolved in water and pumped into the ballast tubing. The labor and impact on the environment for machinery to move (i.e. pump utilizing, for example, traditional concrete pumping machinery and vehicles) the ballast material is minimized with this new innovative system whereas, for example, rubber roofs on buildings and fields have been severely damaged in large commercial solar installations from equipment moving large concrete blocks for existing ballast systems.

Moreover, the present invention lends itself to use in connection with other objects such as windmills boardwalks or walkways through sensitive areas such as wetlands and the like, and to generally hold or support any type of object.

Similarly, when eventual removal of the system is necessary, the environmental impact is minimized with this new innovative system by simply vacuuming the ballast material from the ballast tubes without damaging the terrain. The integrated wire management system further reduces terrain impact on installation and removal.

It is important to note that the present invention is not intended to be limited to a device or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A method of constructing a modular solar panel support framework, comprising the steps of:
   providing a plurality of lengths of flexible corrugated plastic drainage pipe, said pipe lengths having an exterior circumference surrounding an interior having a substantially circular cross section, and extending in a longitudinal direction between two ends thereof;
   providing a plurality of coupling devices, each coupling device having a holding region that receives at least two of said pipe lengths and locks about a region of said circumference of said pipe lengths to maintain said pipe lengths in a spaced and parallel position at said region of said circumference, said coupling devices further provided with an attachment point;
   providing a plurality of solar panel support elements configured to connect to said attachment points of the coupling devices;
   placing at least two said pipe lengths in parallel on a solid supporting surface;
   engaging said coupling devices with said pipe lengths about their exterior circumferences, so that the pipe lengths are connected together by the coupling devices and rest in parallel on the supporting surface, leaving the supporting surface substantially undisturbed;
   injecting a slurry material into the interior of said pipe lengths to ballast the pipe lengths; and
   connecting said solar panel support elements to said coupling devices to support at least one modular solar panel in a position above and spaced from the coupling devices.

2. The method of claim 1, including the further steps of:
   installing an electrical wire conduit in a central region of at least one of said first or second pipe lengths;
   routing electrical wires through said conduit; and
   connecting said electrical wires to carry electricity generated by said solar panel.

3. The method of claim 2, including the further step of providing a conduit support structure configured to support said conduit in a generally fixed position relative to the pipe length containing the conduit, and installing said conduit support structure in the pipe length containing the conduit to support said conduit.

4. The method of claim 1, wherein said ballast material is selected from the group consisting of mud, sand, silt, soil and cement.

5. The method of claim 4, wherein said ballast material is mixed with water and a slurry pumping mechanism is used to insert the ballast material in said first and second pipe lengths.

6. The method of claim 1, wherein each said coupling device includes two pieces linked at a first end thereof and with a locking structure at a second end opposite to the first end, and wherein the method comprises the further steps of:
   opening said coupling device to receive said pipe lengths;
   closing said coupling device around said pipe lengths; and
   locking said coupling device around said pipe lengths by engaging said locking structure so that said coupling device retains said pipe lengths.

7. The method of claim 6, wherein said two pieces of the coupling device are linked by a hinge at the first end thereof.

8. The method of claim 1 including the further steps of:
   providing a plurality of additional pipe lengths and coupling devices;
   providing a plurality of solar panels to be supported; and
   installing said additional pipe lengths and coupling devices to maintain said additional pipe lengths in a desired position relative to one another and relative to said solar panels.

9. The method of claim 8, wherein each said coupling device includes two pieces linked at a first end thereof and with a locking structure at a second end opposite to the first end, and wherein the method comprises the further steps of:
   opening said coupling device to receive said pipe lengths;
   closing said coupling device around said pipe lengths; and
   locking said coupling device around said pipe lengths by engaging said locking structure so that said coupling device retains said pipe lengths.

10. The method of claim 9, wherein said two pieces of the coupling device are linked by a hinge at the first end thereof.

11. A method of constructing a modular solar panel support framework, comprising the steps of:
(a) providing a plurality of lengths of flexible corrugated plastic drainage pipe, said pipe lengths having an exterior circumference surrounding an interior having a substantially circular cross section, and extending in a longitudinal direction between two ends thereof;
(b) providing a plurality of coupling devices, each coupling device having a holding region that receives at least two of said pipe lengths and locks about a region of said circumference of said pipe lengths to maintain said pipe lengths in a spaced and parallel position at said region of said circumference, said coupling devices each provided with support attachment points;
(c) providing a plurality of solar panel support elements configured to connect to said attachment points of the coupling devices;
(d) placing at least two said pipe lengths in parallel on a solid supporting surface;
(e) engaging said coupling device with said pipe lengths and locking the coupling device about their exterior circumferences to form a ballasting assembly of pipe lengths connected by coupling devices, resting in parallel on the supporting surface, leaving the supporting surface substantially undisturbed;
(f) repeating steps (d) and (e) to provide an array of said ballasting assemblies on the supporting surface;
(g) mixing a slurry material with water and pumping said slurry material into the interior of said pipe lengths to ballast the pipe lengths; and
(h) connecting said solar panel support elements to said coupling devices to support an array of modular solar panels in a position above and spaced from the array of ballasting assemblies.

12. The method of claim 11, wherein each said coupling device is hinged at a first end thereof and has a locking structure at a second end opposite to the first end, and wherein the method comprises the further steps of:
opening said coupling device around the hinge to receive said pipe lengths;
closing said coupling device around said pipe lengths; and
locking said coupling device around said pipe lengths by engaging said locking structure so that said coupling device retains said pipe lengths.

13. The method of claim 11, including the further steps of:
installing an electrical wire conduit through a central region of a plurality of said pipe lengths;
routing electrical wires through said conduit; and
connecting said electrical wires to carry electricity generated by said solar panels.

14. The method of claim 13, including the further step of installing conduit support structures in the pipe lengths containing the conduit to support said conduit in a generally fixed position along the central longitudinal axis of the conduit.

15. The method of claim 11, wherein said ballast material is selected from the group consisting of mud, sand, silt, soil and cement.

16. The method of claim 11, wherein said supporting surface is a hillside and a plurality of lines of said ballasting assemblies are positioned on the hillside, in parallel at increasing altitudes to support said solar array on the hillside.

17. The method of claim 11, comprising the further steps of:
placing a plurality of said ballasting assemblies in said array end-to-end with ends of said pipe sections in one ballasting assembly aligned with ends of said pipe sections in an adjacent ballasting assembly;
coupling said adjacent, aligned pipe sections together with a pipe coupler.

18. A method of constructing a modular solar panel support framework, comprising the steps of:
(a) providing a plurality of lengths of pipe, said pipe lengths having an exterior circumference surrounding an interior having a substantially circular cross section, and extending in a longitudinal direction between two ends thereof;
(b) providing a plurality of coupling devices, each coupling device having a holding region that receives at least two of said pipe lengths and locks about a region of said circumference of said pipe lengths to maintain said pipe lengths in a spaced and parallel position at said region of said circumference;
(c) placing at least two said pipe lengths in parallel on a solid supporting surface that includes a hillside;
(d) engaging said coupling device with said pipe lengths and locking the coupling device about their exterior circumferences to form a ballasting assembly of pipe lengths connected by coupling devices, resting in parallel on the supporting surface, leaving the supporting surface substantially undisturbed;
(e) repeating steps (c) and (d) to provide an array of said ballasting assemblies on the supporting surface, including ballasting assemblies positioned on the hillside, in parallel at increasing altitudes to support said solar array on the hillside;
(f) providing a plurality of solar panel support elements;
(g) providing support attachments on a plurality of said coupling devices, said support attachments constructed to receive said solar panel support elements and having a capacity to adjust an angular position of said solar panel support element relative to said coupling device;
(h) mixing a slurry material with water and pumping said slurry material into the interior of said pipe lengths to ballast the pipe lengths; and
(i) connecting said solar panel support elements to said coupling devices and adjusting said angular position of said solar panel support elements relative to said coupling devices to support an array of modular solar panels on the hillside in a position above and spaced from the array of ballasting assemblies.

19. The method of claim 18, including the further steps of:
installing an electrical wire conduit through a central region of a plurality of said pipe lengths;
routing electrical wires through said conduit; and
connecting said electrical wires to carry electricity generated by said solar panels.

20. The method of claim 18, wherein said pipe lengths comprise flexible corrugated plastic drainage pipe.

\* \* \* \* \*